United States Patent
Jung et al.

(10) Patent No.: US 9,085,686 B2
(45) Date of Patent: Jul. 21, 2015

(54) RUBBER POLYMER LATEX WITH MULTI-LAYER CORE-SHELL STRUCTURE, PREPARATION METHOD THEREOF AND ACRYLONITRILE-BUTADIENE-STYRENE GRAFT COPOLYMER COMPRISING THE SAME

(71) Applicant: LG Chem, Ltd., Seoul (KR)

(72) Inventors: Yu Sung Jung, Daejeon (KR); Joo Byung Chai, Daejeon (KR); Eun Seon Park, Daejeon (KR); Tae Young Jeon, Daejeon (KR); Keun Hoon Yoo, Daejeon (KR); Bong Keun Ahn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/265,992

(22) Filed: Apr. 30, 2014

(65) Prior Publication Data

US 2014/0378576 A1    Dec. 25, 2014

Related U.S. Application Data

(63) Continuation of application No. PCT/KR2013/012231, filed on Dec. 26, 2013.

(30) Foreign Application Priority Data

Jun. 19, 2013  (KR) .................. 10-2013-0070036

(51) Int. Cl.
  *C08L 55/02* (2006.01)
  *C08F 279/02* (2006.01)
  *C08F 285/00* (2006.01)

(52) U.S. Cl.
  CPC .............. *C08L 55/02* (2013.01); *C08F 279/02* (2013.01); *C08F 285/00* (2013.01)

(58) Field of Classification Search
  CPC ....... C08F 279/02; C08F 285/00; C08L 55/02
  See application file for complete search history.

(56) References Cited

U.S. PATENT DOCUMENTS

| | | | |
|---|---|---|---|
| 5,534,594 A | 7/1996 | Troy et al. | |
| 6,331,580 B1* | 12/2001 | Molnar | ................. 523/201 |
| 2005/0203247 A1 | 9/2005 | Ahn et al. | |
| 2009/0043047 A1 | 2/2009 | Ha et al. | |

FOREIGN PATENT DOCUMENTS

| | | |
|---|---|---|
| KR | 10-1995-0009727 | 8/1995 |
| KR | 10-1996-0022580 | 7/1996 |
| KR | 10-2004-0049066 | 6/2004 |
| KR | 10-2007-0108008 | 11/2007 |
| KR | 10-0789108 | 12/2007 |
| KR | 10-1223295 | 1/2013 |

* cited by examiner

*Primary Examiner* — Vickey Nerangis
(74) *Attorney, Agent, or Firm* — McKenna Long & Aldridge, LLP

(57) ABSTRACT

The disclosed is a rubber polymer latex with a multi-layer core-shell structure that includes a diene-based rubber core of a conjugated diene-based monomer; a bridge shell formed on the rubber core of a vinyl-based monomer; and an outermost shell formed on the bridge shell of an acryl-based monomer.

15 Claims, No Drawings

RUBBER POLYMER LATEX WITH MULTI-LAYER CORE-SHELL STRUCTURE, PREPARATION METHOD THEREOF AND ACRYLONITRILE-BUTADIENE-STYRENE GRAFT COPOLYMER COMPRISING THE SAME

This application is a Continuation Bypass Application of International Patent Application No. PCT/KR2013/012231, filed on Dec. 26,2013, and claims the benefit of Korean Patent Application Nos. 10-2013-0070036, filed on Jun. 19,2013 and 10-2013-0164212, filed on Dec. 26, 2013, in the Korean Intellectual Property Office, all of which are incorporated herein by reference in their entirety.

TECHNICAL FIELD

The present invention relates to rubber polymer latex with a multi-layer core-shell structure comprising a diene-based rubber core, a bridge shell wrapping the diene-based rubber core and an outermost shell wrapping the bridge shell, a method of preparing thereof, and an acrylonitrile-butadiene-styrene graft copolymer comprising the same.

BACKGROUND ART

A conjugated diene rubber polymer having excellent rubber properties is widely used as an impact resistance reinforcing member of various thermoplastic resins such as an acrylonitrile-butadiene-styrene (ABS) resin and a methacrylate-butadiene-styrene (MBS) resin. Particularly, the ABS resin has good properties including impact resistance, chemical resistance, forming processability, etc., and is widely used as a material in an office machine, an electrical and electronic component, an interior material of an automobile, etc. However, the ABS resin containing a large amount of conjugated diene-based double bonds in a rubber component may be easily aged by external energy such as light or heat.

To solve the above-described limitations, a resin using an acryl rubber and a resin using an ethylene propylene diene rubber have been provided instead of a butadiene rubber, however have markedly inferior impact resistance when compared with the ABS resin. In addition, when large-sized particles are formed to improve the impact resistance, the gloss and coloring properties of a final product may be deteriorated, thereby decreasing the value of the final product.

Meanwhile, researches on improving the weather resistance of the ABS resin by adding an additive have been conducted. However, the addition of the additive or the change of a combination may increase production cost, and the commercial value of a formed product may decrease because of the surface impurities of the formed product due to the additive during processing.

Further, a method of preparing a composite rubber copolymer through mixing diene-based copolymer latex and alkyl acrylate copolymer latex, and performing an acidic enlarging process has been conducted. However, when the amount of the diene-based copolymer latex is increased to improve impact resistance, the fusion of latex during performing the acidic enlarging process may not be generated due to the difference of the glass transition temperature with the alkyl acrylate copolymer latex. Thus, the enlargement of particles may not be attained and no effect may be obtainable. In addition, the preparation of the composite rubber copolymer may be difficult due to the generation of an excessive amount of latex agglomerate.

Based on the above-described background, the present inventors have conducted researches on a method for improving weather resistance while maintaining good impact resistance and coloring properties of a diene-based rubber component, and have prepared rubber polymer latex with a multi-layer core-shell structure comprising a diene-based rubber core, a bridge shell including a vinyl-based monomer wrapping the diene-based rubber core, and an outermost shell including an acryl-based monomer wrapping the bridge shell. Then, the inventors prepared a thermoplastic resin including the rubber polymer latex with a multi-layer core-shell structure by using an ABS graft copolymer, and secured that the thermoplastic resin has good impact strength, good coloring properties and markedly improved weather resistance, thereby completing the present invention.

DISCLOSURE OF THE INVENTION

Technical Problem

An object of the present invention is to provide rubber polymer latex with a multi-layer core-shell structure that may improve weather resistance while maintaining good properties of a diene-based rubber component.

Other object of the present invention is to provide a method of preparing the rubber polymer latex with a multi-layer core-shell structure.

Another object of the present invention is to provide an acrylonitrile-butadiene-styrene graft copolymer including the rubber polymer latex with a multi-layer core-shell structure.

Further object of the present invention to provide a thermoplastic resin composition including the acrylonitrile-butadiene-styrene graft copolymer.

Technical Solution

To achieve these and other advantages and in accordance with the purpose of the present invention as embodied and broadly described, there is provided rubber polymer latex with a multi-layer core-shell structure, comprising based on 100 parts by weight of total monomers composing the rubber polymer latex with a multi-layer core-shell structure, a diene-based rubber core including from 75 to 85 parts by weight of a conjugated diene-based monomer, a bridge shell formed on the rubber core and including from 5 to 10 parts by weight of a vinyl-based monomer, and an outermost shell formed on the bridge shell and including from 10 to 15 parts by weight of an acryl-based monomer. An average particle diameter of the diene-based rubber core is in a range from 2,000 Å to 3,000 Å, and a weight ratio of the core, the bridge shell and the outermost shell is 15-17:1-2:2-3.

There is also provided in the present invention, a method of preparing rubber polymer latex with a multi-layer core-shell, comprising based on 100 parts by weight of monomers composing the rubber polymer latex with a multi-layer core-shell, adding from 75 to 85 parts by weight of a conjugated diene-based monomer into a polymerization reactor and initiating polymerization to form a diene-based rubber core having an average particle diameter from 2,000 Å to 3,000 Å (Step 1), polymerizing a vinyl-based monomer while continuously adding a mixture of 1 to 10 parts by weight of the vinyl-based monomer and 0.01 to 0.1 parts by weight of a cross-linking agent into the polymerization reactor when a polymerization conversion of the conjugated diene-based monomer arrives at a range from 40% to 60% to form a bridge shell on the diene-based rubber core (Step 2), and polymerizing a acryl-based monomer while continuously adding a mixture including from 10 to 15 parts by weight of the acryl-based monomer and from 0.01 to 0.1 parts by weight of a cross-linking agent into the polymerization reactor when a polymerization conversion of the conjugated diene-based monomer arrives at range from 70% to 90% to form an outermost shell on the bridge shell (Step 3).

In addition, there is provided in the present invention, an acrylonitrile-butadiene-styrene (ABS) graft copolymer comprising from 50 wt % to 70 wt % of the rubber polymer latex with a multi-layer core-shell structure, and from 30 wt % to 50 wt % of at least one vinyl-based monomer selected from an aromatic vinyl monomer and a vinyl cyan monomer.

Furthermore, there is provided in the present invention, a thermoplastic resin composition comprising from 21 to 30 parts by weight of the ABS graft copolymer, and from 70 to 79 parts by weight of a copolymer of an aromatic vinyl monomer and a vinyl cyan monomer having a weight average molecular weight from 120,000 g/mol to 150,000 g/mol, based on 100 parts by weight of the thermoplastic resin composition.

Advantageous Effects

The rubber polymer latex with a multi-layer core-shell structure comprising the diene-based rubber core, the bridge shell including the vinyl-based monomer wrapping the rubber core, and the outermost shell including the acryl-based monomer wrapping the bridge shell according to the present invention may improve the low weather resistance of the diene-based rubber component while maintaining the properties of the diene-based rubber component. Thus, the impact resistance, the coloring properties and the weather resistance of the acrylonitrile-butadiene-styrene graft copolymer including the rubber polymer latex may be improved.

Therefore, the impact strength, the coloring properties and the weather resistance of the thermoplastic resin including the acrylonitrile-butadiene-styrene graft copolymer may be improved, and the thermoplastic resin may be easily applied in industries using thereof.

MODE FOR CARRYING OUT THE INVENTION

Hereinafter the present invention will be explained in more detail to assist the understanding thereof.

In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

According to the present invention, the properties of a diene-based rubber having low weather resistance may be improved, and rubber polymer latex with a multi-layer core-shell structure, that may prepare a thermoplastic resin finally having high weather resistance as well as good impact strength and coloring properties may be provided.

Generally, a diene rubber polymer having excellent rubber properties is widely used as an impact resistance reinforcing member of various thermoplastic resins such as acrylonitrile-butadiene-styrene (ABS) or methacrylate-butadiene-styrene (MBS) graft copolymer. The graft copolymer (such as ABS or MBS) including the diene-based rubber polymer has good properties such as impact resistance, chemical resistance, formability, etc., and the availability thereof is recognized.

However, the diene-based rubber polymer is weak to oxygen, ozone and heat in the air or light (ultraviolet) due to a diene-based rubber component including an unsaturated bond.

An acrylate-styrene-acrylonitrile (ASA) resin using an acryl-based rubber polymer excluding the unsaturated bond has been suggested instead of the diene-based rubber component including the unsaturated bond. However, the acryl-based rubber component excluding the unsaturated bond has low impact strength reinforcing effect, low impact strength reinforcing effect at a low temperature, and deteriorated glossness when compared with the diene-based rubber component.

Thus, researches on improving weather resistance while maintaining impact resistance and chemical resistance, that are inherent properties of the diene-based rubber component, are in need.

In the present invention, rubber polymer latex with a multi-layer core-shell structure having good impact resistance, coloring properties, and weather resistance, and including a diene-based rubber core, a bridge shell including a vinyl-based monomer formed on the diene-based rubber core, and an outermost shell including an acryl-based monomer formed on the bridge shell, are provided.

The rubber polymer latex with a multi-layer core-shell structure according to an embodiment of the present invention is characterized in comprising a diene-based rubber core including from 75 to 85 parts by weight of a conjugated diene-based monomer; a bridge shell formed on the rubber core and including from 5 to 10 parts by weight of a vinyl-based monomer; and an outermost shell formed on the bridge shell and including 10 to 15 parts by weight of an acryl-based monomer, based on 100 parts by weight of the total monomers composing the rubber polymer latex with a multi-layer core-shell structure. The average particle diameter of the diene-based rubber core is in the range of 2,000 Å to 3,000 Å, and the weight ratio of the core, the bridge cell and the outermost shell is 15-17:1-2:2-3.

The average particle diameter of the diene-based rubber core may be 2,000 Å to 3,000 Å as described above, preferably may be 2,400 Å to 2,800 Å, more preferably may be 2,500 Å to 2,700 Å, and particularly preferably may be 2,500 Å to 2,650 Å. In addition, the diene-based rubber core may include 75 to 85 parts by weight of the conjugated diene-based monomer based on 100 parts by weight of the total monomers composing the rubber polymer latex with a multi-layer core-shell structure including the diene-based rubber core, and preferably may include 80 to 85 parts by weight. When the amount of the conjugated diene-based monomer deviates from the above-defined range, the impact resistance may be deteriorated, and the impact strength of a finally produced resin including the conjugated diene-based monomer may be deteriorated.

The conjugated diene-based monomer may include at least one selected from the group consisting of 1,3-butadiene, isoprene, 2-chloro-1,3-butadiene and chloroprene, and preferably may include 1,3-butadiene.

The bridge shell may be formed between the diene-based rubber core and the acryl-based outermost shell, if not specifically defined, and may play the role of a bridge between the diene-based rubber core and the acryl-based outermost shell having no reactivity to each other. The bridge shell may restrain the self-polymerization of the acryl-based monomers forming the outermost shell, increase impact resistance by controlling the internal structure of rubber particles, and improve the efficiency of the outermost shell.

The bridge shell may include 1 to 10 parts by weight of the vinyl-based monomer and preferably may include 5 to 10 parts by weight of the vinyl-based monomer based on 100 parts by weight of the total monomers composing the rubber polymer latex with a multi-layer core-shell structure including the bridge shell. When the amount of the vinyl-based monomer deviates from the above-defined range, the impact resistance may be deteriorated, and the impact strength of a finally produced resin may be deteriorated.

The vinyl-based monomer included in the bridge shell may include an aromatic vinyl monomer, a vinyl cyan monomer, or a combination thereof. When the vinyl-based monomer is the combination of the aromatic vinyl monomer and the vinyl cyan monomer, the aromatic vinyl monomer and the vinyl cyan monomer may be included by the weight ratio from 9:1 to 7:3.

The aromatic vinyl monomer may include at least one selected from the group consisting of styrene, α-methylstyrene, α-ethylstyrene and p-methylstyrene, and preferably may include the styrene.

The vinyl cyan monomer may include at least one selected from the group consisting of acrylonitrile, methacrylonitrile and ethacrylonitrile, and preferably may include the acrylonitrile.

The outermost shell may include 10 to 15 parts by weight of the acryl-based monomer based on 100 parts by weight of the total monomer composing the rubber polymer latex with a multi-layer core-shell structure including the outermost shell, as described above. When the amount of the acryl-based monomer is less than 10 parts by weight, the improvement of the weather resistance may be insignificant, and when the amount exceeds 15 parts by weight, the weather resistance may be markedly improved, however a glass transition temperature may increase to deteriorate impact resistance.

The acryl-based monomer may be at least one selected from the group consisting of (meth)acrylic acid and alkyl (meth)acrylate having an $C_1$-$C_{16}$ alkyl group. Particularly, the acryl-based monomer may include at least one selected from the group consisting of acrylic acid, methacrylic acid, methyl methacrylate, ethyl methacrylate, 2-ethylhexyl methacrylate, methyl acrylate, ethyl acrylate and butyl acrylate, and preferably may include the butyl acrylate.

The diene-based rubber core, the bridge shell, and the outermost shell according to the present invention may have the weight ratio of 15-17:1-2:2-3, as described above, and preferably may have the weight ratio from 16:1:3 to 17:1:2.

In addition, the rubber polymer latex with a multi-layer core-shell structure according to the present invention includes the diene-based rubber core, the bridge shell including the vinyl-based monomer wrapping the diene-based rubber core, and the outermost shell including the acryl-based monomer wrapping the vinyl-based bridge shell, and has an average particle diameter from 3,000 Å to 3,500 Å. Preferably, the average particle diameter may be from 3,200 Å to 3400 Å, and more preferably, may be from 3,250 Å to 3300 Å. When the average particle diameter is less than 3,000 Å, the impact resistance may be deteriorated during preparing a graft copolymer including the rubber polymer latex, and when the average particle diameter exceeds 3,500 Å, the coloring properties during preparing the graft copolymer including the rubber polymer latex may be lowered.

In addition, the rubber polymer latex with a multi-layer core-shell structure may have the above-described average particle diameter and at the same time may have the gel content from 70% to 90%, and preferably may have 80% to 85%.

In addition, the present invention provided a method of preparing the rubber polymer latex with a multi-layer core-shell structure.

A method of preparing the rubber polymer latex with a multi-layer core-shell structure according to an embodiment of the present invention comprises based on 100 parts by weight of total monomers composing the rubber polymer latex with a multi-layer core-shell structure, adding 75 to 85 parts by weight of a conjugated diene-based monomer into a polymerization reactor and initiating polymerization to form a diene-based rubber core having an average particle diameter from 2,000 Å to 3,000 Å (Step 1); polymerizing a vinyl-based monomer while continuously adding a mixture including 1 to 10 parts by weight of the vinyl-based monomer and 0.01 to 0.1 parts by weight of a cross-linking agent into the polymerization reactor when the polymer conversion arrives at a range from 40% to 60% to form a bridge shell on the diene-based rubber core (Step 2); and polymerizing a acryl-based monomer while continuously adding 10 to 15 parts by weight of the acryl-based monomer and 0.01 to 0.1 parts by weight of the cross-linking agent into the polymerization reactor when the polymer conversion arrives at a range from 70% to 90% to form an outermost shell on the bridge shell (Step 3).

In addition, the polymerization at Step 1, Step 2 or Step 3 is performed in the presence of an emulsifier to secure favorable polymerization of latex and storage stability.

Step 1 is for forming the diene-based rubber core, and is a step for performing an emulsion polymerization after adding the conjugated diene-based monomer into the polymerization reactor at from 65° C. to 75° C. in a batch, or continuously.

Particularly, Step 1 may be performed by adding from 75 to 85 parts by weight, preferably from 80 to 85 parts by weight of a conjugated diene-based monomer, from 0.5 to 3.0 parts by weight of an emulsifier, from 10 to 70 parts by weight of water, from 0.1 to 1.5 parts by weight of a molecular weight controlling agent, from 0.05 to 2.5 parts by weight of a polymerization initiator, and from 0.1 to 2.0 parts by weight of an electrolyte based on 100 parts by weight of the total monomers composing the rubber polymer latex with a multi-layer core-shell structure into a polymerization reactor in a batch, or continuously, and performing an emulsion polymerization.

The conjugated diene-based monomer may be the same as those described above.

The emulsifier may be at least one selected from the group consisting of an anionic adsorption type emulsifier, a non-ionic emulsifier, a reactive emulsifier, and a polymeric reactive emulsifier.

Particularly, the anionic adsorption type emulsifier may be at least one selected from the group consisting of potassium rosinate, potassium salts of fatty acids, sodium lauryl sulfonate and sodium alkylbenzene sulfonate. The non-ionic emulsifier may be polyoxyethylene alkyl phenyl ether.

In addition, the reactive emulsifier may be at least one selected from the group consisting of sodium dodecyl allyl sulfosuccinate (TREM LF-40), dipotassium $C_{16}$-$C_{18}$ alkenyl succinate (Latemul ASK series), sodium acrylamido stearate (NaAAS) and sodium 3-sulfopropyl tetradodecyl maleate (M14). The polymeric reactive emulsifier may be at least one selected from the group consisting of polyoxyethylene alkyl phenyl ether ammonium sulfate and polyoxyethylene alkyl ether sulfate ester ammonium salt (HITENOL series).

The polymerization initiator may include, without specific limitation, an aqueous persulfate-based polymerization initiator such as potassium persulfate, sodium persulfate and ammonium persulfate; and a redox-based polymerization initiator including peroxide as one component such as hydrogen peroxide, cumene hydroperoxide, diisopropyl benzene hydroperoxide, tert-butyl hydroperoxide and paramethane hydroperoxide. These compounds may be used alone or as a mixture of two or more.

The electrolyte may include, without specific limitation, at least one selected from the group consisting of potassium chloride, sodium chloride, potassium bicarbonate ($KHCO_3$), sodium bicarbonate ($NaHCO_3$), potassium carbonate ($K_2CO_3$), sodium carbonate ($Na_2CO_3$), potassium bisulfite ($KHSO_3$), sodium bisulfite ($NaHSO_3$), potassium pyrophosphate ($K_4P_2O_7$), sodium pyrophosphate ($Na_4P_2O_7$), potassium phosphate ($K_3PO_4$), sodium phosphate ($Na_3PO_4$), dipotassium hydrogen phosphate ($K_2HPO_4$) and disodium hydrogen phosphate.

The molecular weight controlling agent may include commonly used compounds in the art without specific limitation. For example, mercaptans may be used.

Step 2 is for forming a bridge shell on the diene-based rubber core formed in Step 1 and is performed by continuously adding a mixture of a vinyl-based monomer and a cross-linking agent into the polymerization reactor when the polymerization conversion arrives at a range from 40% to 60% and polymerizing.

Particularly, Step 2 may be performed by continuously adding a mixture from 1 to 10 parts by weight, preferably from 5 to 10 parts by weight of a vinyl monomer, from 0.01 to 0.1 parts by weight of a cross-linking agent, and from 0.1 to 0.5 parts by weight of an emulsifier based on 100 parts by weight of the total monomers composing the rubber polymer with multi-layers when the polymerization conversion arrives at a range from 40% to 60%, and polymerizing.

During performing the polymerization, when the amount ranges of the vinyl-based monomer, the cross-linking agent and the emulsifier deviate from the above-described ranges, the impact resistance of the rubber polymer latex with a multi-layer core-shell structure finally produced may be deteriorated.

In addition, at the point of 40% that is the lower limit of the range of the polymerization conversion, the particles of the diene-based rubber core are stabilized, and an internal cross-linking is initiated. The mixture including the vinyl-based monomer, the cross-linking agent and the emulsifier is continuously add and polymerization is performed until the polymerization conversion reaches 60%, thereby effectively forming the bridge shell on the diene-based rubber core. In addition, the bridge shell may have a cross-linked state by the cross-linking agent.

The vinyl-based monomer may be an aromatic vinyl monomer, a vinyl cyan monomer or a combination thereof. Particular examples of the aromatic vinyl monomer and the vinyl cyan monomer may be the same as those described above.

The cross-linking agent may be at least one selected from the group consisting of polyethylene glycol dimethacrylate (n=1-60), polyethylene glycol diacrylate (n=1-60), propylene glycol dimethacrylate, 1,3-butylene glycol dimethacrylate, 1,6-hexanediol dimethacrylate, 1,4-butylene glycol dimethacrylate, aryl methacrylate, diethyl glycol dimethacrylate, trimethylolpropane trimethacryalte, polybisphenol A-ethylene oxide diacrylate (n=1-40), tetraethylene glycol dimethacrylate, triethylene glycol dimethacrylate and divinylbenzene, or may be a compound containing two or more vinyl functional groups at the terminal thereof.

The emulsifier may be the same as those described above.

Step 3 is for forming the outermost shell on the bridge shell. A mixture of an acryl-based monomer and a cross-linking agent is continuously add into the polymerization reactor when the polymerization conversion of the conjugated diene-based monomer arrives at a range from 70% to 90% and is polymerized to form the outermost shell on the bridge shell.

Particularly, Step 3 may be performed by adding from 10 to 15 parts by weight of the acryl-based monomer, from 0.01 to 0.1 parts by weight of the cross-linking agent and from 0.1 to 0.5 parts by weight of the emulsifier based on 100 parts by weight of the total monomers composing the rubber polymer with the multi-layers when the polymerization conversion of the conjugated diene-based monomer arrives at least 70%, preferably from 70% to 90%, and by polymerizing.

At the point when the polymerization conversion arrives at 70%, internal cross-linking proceeded to some degree, and the point may be an appropriate point for forming the outermost shell stably. Thus, the outermost shell may be effectively formed by continuously adding a mixture including the acryl-based monomer at the point when the polymerization conversion arrives at least 70%, and polymerizing. In addition, the outermost shell may have a cross-linked state by the cross-linking agent.

The acryl-based monomer, the cross-linking agent and the emulsifier may be the same as those described above.

In addition, the present invention provides an ABS graft copolymer comprising from 50 wt % to 70 wt % of the rubber polymer latex with a multi-layer core-shell structure, and from 30 wt % to 50 wt % of the vinyl-based monomer.

The ABS graft copolymer according to an embodiment of the present invention may preferably comprise from 60 wt % to 70 wt % of the rubber polymer latex with a multi-layer core-shell structure, and from 30 wt % to 40 wt % of the vinyl-based monomer.

The vinyl-based monomer may be an aromatic vinyl monomer, a vinyl cyan monomer or a combination thereof.

When the vinyl monomer is the combination of the aromatic vinyl monomer and the vinyl cyan monomer, the aromatic vinyl monomer and the vinyl cyan monomer may have the weight ratio of 1:1 to 9:1, and preferably may have the weight ratio from 1:1 to 7:1.

The aromatic vinyl monomer and the vinyl cyan monomer may be the same as those described above.

Meanwhile, the ABS graft copolymer comprising the rubber polymer latex with a multi-layer core-shell structure may be produced by a commonly known method in the art without specific limitation.

For example, the ABS graft copolymer may be prepared by adding an aromatic vinyl monomer, a vinyl cyan monomer, and an additive such as an emulsifier, a polymerization initiator, a molecular weight controlling agent, etc. into the rubber polymer latex with a multi-layer core-shell, and graft polymerizing.

The additive such as the emulsifier, the polymerization initiator, the molecular weight controlling agent, etc. may be the same as those described above.

In addition, the present invention provides a thermoplastic resin composition comprising, based on 100 parts by weight of the thermoplastic resin composition, from 21 to 30 parts by weight of the ABS graft copolymer; and from 70 to 79 parts by weight of a copolymer of an aromatic vinyl monomer and a vinyl cyan monomer, having the weight average molecular weight from 120,000 g/mol to 150,000 g/mol.

Preferably, the thermoplastic resin composition of the present invention may include from 21 to 26 parts by weight of the ABS graft copolymer and from 74 to 79 parts by weight of the copolymer of the aromatic vinyl monomer and the vinyl cyan monomer based on 100 parts by weight of the thermoplastic resin composition.

In the thermoplastic resin composition according to an embodiment of the present invention, the amount of the ABS graft copolymer may be controlled according to the amount of the rubber material. Particularly, the amount of the ABS graft copolymer may be controlled so that the amount of the rubber material is from 10% to 20%, preferably from 12% to 18%, and more preferably from 14% to 16%.

The copolymer of the aromatic vinyl monomer and the vinyl cyan monomer may be a copolymer of the aromatic vinyl monomer and the vinyl cyan monomer having the weight average molecular weight from 120,000 g/mol to 150,000 g/mol, and preferably may be a copolymer of the aromatic vinyl monomer and the vinyl cyan monomer having the weight average molecular weight from 130,000 g/mol to 140,000 g/mol.

The copolymer of the aromatic vinyl monomer and the vinyl cyan monomer may include, without specific limitation, from 72 wt % to 77 wt % of an aromatic vinyl monomer and from 23 wt % to 28 wt % of a vinyl cyan monomer.

Hereinafter the present invention will be described in more detail with reference to the following examples and experimental examples. However, the following examples and experimental examples are illustrated only as embodiments of the present invention and are not intended to limit the scope of the present invention.

EXAMPLE 1

Into a nitrogen gas substituted polymerization reactor (autocalve), 60 parts by weight of ion exchanged water, 85 parts by weight of 1,3-butadiene monomer, 1 part by weight of potassium rosinate as an emulsifier, 0.8 parts by weight of potassium oleate, 1.2 parts by weight of potassium carbonate ($K_2CO_3$) as an electrolyte, 0.3 parts by weight of tert-dodecylmercaptan (TDDM) as a molecular weight controlling agent, and 0.3 parts by weight of potassium persulfate ($K_2S_2O_8$) based on 100 parts by weight of the total monomers composing rubber polymer latex with a multi-layer core-shell structure were added in a batch, and polymerization was performed at the reaction temperature of 70° C. to produce a diene-based rubber core.

During the polymerization (during forming the diene-based rubber core), a mixture of 5 parts by weight of ion exchanged water, 5 parts by weight of styrene, 0.01 parts by weight of aryl methacrylate, and 0.1 parts by weight of potassium rosinate were add continuously by a certain amount from the point of 50% of the polymerization conversion to the point of 60% of the polymerization conversion. The polymerization was performed at 75° C. to form a bridge shell wrapping the diene-based rubber core on the diene-based rubber core.

During the polymerization for forming the bridge shell, a mixture of 10 parts by weight of ion exchanged water, 10 parts by weight of butyl acrylate, 0.01 parts by weight of aryl methacrylate, and 0.1 parts by weight of potassium rosinate were add continuously by a certain amount from the point of 70% of the polymerization conversion to the point of 90% of the polymerization conversion. The polymerization was performed to form an outermost shell wrapping the bridge shell on the bridge shell.

Then, the polymerization temperature was elevated to 80° C., and the reaction was terminated to produce rubber polymer latex with a multi-layer core-shell structure.

EXAMPLE 2

Rubber polymer latex with a multi-layer core-shell structure was produced by performing the same procedure described in Example 1 except that 80 parts by weight of the 1,3-butadiene monomer and 15 parts by weight of the butyl acrylate were used.

COMPARATIVE EXAMPLE 1

Rubber polymer latex was produced by performing the same procedure described in Example 1 except that 100 parts by weight of the 1,3-butadiene monomer was used, and the styrene and the butyl acrylate were excluded.

COMPARATIVE EXAMPLE 2

Rubber polymer latex with a multi-layer core-shell structure was produced by performing the same procedure described in Example 1 except that 5 parts by weight of 1,3-butadiene monomer was used instead of the styrene as the monomer for forming the bridge shell.

COMPARATIVE EXAMPLE 3

Rubber polymer latex with a multi-layer core-shell structure was produced by performing the same procedure described in Example 1 except that 70 parts by weight of the 1,3-butadiene monomer and 25 parts by weight of the butyl acrylate were used.

COMPARATIVE EXAMPLE 4

Rubber polymer latex with a multi-layer core-shell structure was produced by performing the same procedure described in Example 1 except that each of a mixture including the styrene for forming the bridge shell and a mixture including the butyl acrylate for forming the outermost shell was not add continuously but in a batch.

COMPARATIVE EXAMPLE 5

Rubber polymer latex with a multi-layer core-shell structure was produced by performing the same procedure described in Example 1 except that the mixture including the styrene for forming the bridge shell was add at the point of 30% of the polymerization conversion, and the mixture including the butyl acrylate for forming the outermost shell was add at the point of 50% of the polymerization conversion.

The properties of each of the rubber polymer latex produced in the examples and the comparative examples were measured by the following methods. The materials used for producing the rubber polymer latex of the above examples and the comparative examples and the measured results of the properties are illustrated in the following Table 1.

Average particle diameter of latex (A): Average particle diameter was measured by using a laser scattering analyzer (Nicomp 380).

Gel content (%): Methanol was added to the latex thus produced and a precipitation process was performed using sulfuric acid. Then, washing/drying processes were performed to extract a solid content (A), that is, a rubber component. The extract was added in toluene, stood for 24 hours and filtered using an 80 mesh net. The weight of the remaining solid on the net was measured (B), and the gel content was calculated by the following equation.

$$\text{Gel content (\%)} = \frac{\text{Weight of remaining rubber polymer after dissolving}(B)}{\text{Weight of initial rubber polymer}(A)} \times 100$$

TABLE 1

| Division | Example 1 | Example 2 | Comparative Example 1 | Comparative Example 2 | Comparative Example 3 | Comparative Example 4 | Comparative Example 5 |
|---|---|---|---|---|---|---|---|
| Core (parts by weight) | BD (85) | BD (80) | BD (100) | BD (85) | BD (70) | BD (85) | BD (85) |
| Bridge shell (parts by weight) | ST (5) | ST (5) | — | BD (5) | ST (5) | ST (5) | ST (5) |
| Outermost shell (parts by weight) | BA (10) | BA (15) | — | BA (10) | BA (25) | BA (10) | BA (10) |
| Bridge shell adding point (conversion degree %) | 50 | 50 | — | 50 | 50 | 50 | 30 |
| Outermost shell adding point (conversion degree %) | 70 | 70 | — | 70 | 70 | 70 | 50 |
| adding method | continuously | continuously | — | continuously | continuously | In a batch | continuously |
| Core diameter (Å) | 2650 | 2500 | 2700 | 2600 | 2450 | 2650 | 2570 |
| Final diameter (Å) | 3300 | 3250 | 3250 | 3300 | 3100 | 2900 | 2700 |
| Gel content (%) | 80 | 85 | 76 | 80 | 93 | 82 | 90 |

*BD: 1,3-butadiene,
*ST: styrene,
*BA: butyl acrylate

EXAMPLE 3

An ABS graft copolymer including the rubber polymer latex with a multi-layer core-shell structure produced in Example 1 was produced, and a thermoplastic resin specimen using the ABS graft copolymer was formed.

First, 65 parts by weight of the rubber polymer latex with a multi-layer core-shell structure of Example 1, 140 parts by weight of ion exchanged water, 0.1 parts by weight of sodium ethylenediaminetetraacetate, 0.005 parts by weight of ferrous sulfate, 9.23 parts by weight of formaldehyde sodium sulfoxylate, and 0.35 parts by weight of potassium rosinate based on 100 parts by weight of main materials composing the ABS graft copolymer (the rubber polymer latex and monomer compounds) were added in a batch into a nitrogen gas substituted polymerization reactor, and the reaction temperature was elevated to 70° C.

A mixed emulsifying solution of 30 parts by weight of ion exchanged water, 0.65 parts by weight of potassium rosinate, 25 parts by weight of styrene, 10 parts by weight of acrylonitrile, 0.4 parts by weight of tert-dodecylmercaptan, and 0.4 parts by weight of diisopropylene benzene hydroperoxide was continuously added for 2 hours. Then, the polymerization temperature was elevated to 80° C. and aged for 1 hour. After that, the reaction was terminated and an ABS graft copolymer was produced. The ABS copolymer thus produced was coagulated using an aqueous magnesium sulfate solution, washed and dried to obtain an ABS graft copolymer as a powder state.

23 parts by weight of the ABS graft copolymer thus produced (based on 15% of rubber material amount), and 77 parts by weight of a styrene-acrylonitrile copolymer including 76 wt % of styrene and 24 wt % of acrylonitrile and having a weight average molecular weight (Mw) of 140,000 g/mol based on 100 parts by weight of a thermoplastic resin composition were mixed and formed into a pellet by using an extruder. Then, a thermoplastic resin specimen was formed by using an injection machine.

EXAMPLE 4

A thermoplastic resin specimen was formed by performing the same procedure described in Example 3 except that the rubber polymer latex with a multi-layer core-shell structure in Example 2 was used instead of the rubber polymer latex with a multi-layer core-shell structure in Example 1.

COMPARATIVE EXAMPLE 6

A thermoplastic resin specimen was formed by performing the same procedure described in Example 3 except that the rubber polymer latex with a multi-layer core-shell structure in Comparative Example 1 was used instead of the rubber polymer latex with a multi-layer core-shell structure in Example 1.

COMPARATIVE EXAMPLE 7

A thermoplastic resin specimen was formed by performing the same procedure described in Example 3 except that the rubber polymer latex with a multi-layer core-shell structure in Comparative Example 2 was used instead of the rubber polymer latex with a multi-layer core-shell structure in Example 1.

COMPARATIVE EXAMPLE 8

A thermoplastic resin specimen was formed by performing the same procedure described in Example 3 except that the rubber polymer latex with a multi-layer core-shell structure in Comparative Example 3 was used instead of the rubber polymer latex with a multi-layer core-shell structure in Example 1.

COMPARATIVE EXAMPLE 9

A thermoplastic resin specimen was formed by performing the same procedure described in Example 3 except that the rubber polymer latex with a multi-layer core-shell structure in Comparative Example 4 was used instead of the rubber polymer latex with a multi-layer core-shell structure in Example 1.

COMPARATIVE EXAMPLE 10

A thermoplastic resin specimen was formed by performing the same procedure described in Example 3 except that the rubber polymer latex with a multi-layer core-shell structure in Comparative Example 5 was used instead of the rubber polymer latex with a multi-layer core-shell structure in Example 1.

EXPERIMENTAL EXAMPLE

To compare and analyze the properties of each of the thermoplastic resin specimens produced in Examples 3 and 4 and Comparative Examples 6 to 10, impact strength, coloring properties and weather resistance were measured by the following methods. The results are illustrated in the following Table 2.

(1) Impact Strength (Izod Impact Strength)

Each of the thermoplastic specimens of Examples 3 and 4 and Comparative examples 6 to 10 was formed to have a thickness of ¼", and impact strength was measured by ASTM D256 method.

(2) Coloring Properties 0.2 parts by weight of black color easily distinguished by using a Suga Color Computer based on 100 parts by weight of each of the thermoplastic resin specimen was added to each of the thermoplastic resin specimens of Examples 3 and 4 and Comparative Examples 6 to 10 and mixed, and L value was compared to analyze the coloring properties. For reference, in the case that the L value is low, the coloring properties are considered to be good.

(3) Weather Resistance

Each of the thermoplastic resin specimens of Examples 3 and 4 and Comparative Examples 6 to 10 was tested at 83° C. for 72 hours with a water spray cycle of 18 minutes/120 minutes by using a Weather-o-meter (ATLAS Co., Ci35A). The degree of color change ($\Delta E$) of the tested specimens was calculated by the following equation. For reference, when the value approaches 0, the weather resistance was recognized as good.

$$\Delta E = \sqrt{(L)^2 + (a)^2 + (b)^2}$$

TABLE 2

|  | Example 3 | Example 4 | Comparative Example 6 | Comparative Example 7 | Comparative Example 8 | Comparative Example 9 | Comparative Example 10 |
|---|---|---|---|---|---|---|---|
| Impact strength (¼", kgf·cm/cm$^2$) | 25 | 23 | 25 | 24 | 15 | 17 | 14 |
| Coloring properties (L) | 6.5 | 7.0 | 6.0 | 6.7 | 13.6 | 11.2 | 8.5 |
| Weather resistance ($\Delta E$) | 4.1 | 3.2 | 9.0 | 5.0 | 2.8 | 5.5 | 6.5 |

As illustrated in the above Table 2, the thermoplastic resins of Examples 3 and 4 obtained by using the ABS graft copolymer including the rubber polymer latex with a multi-layer core-shell structure according to an embodiment of the present invention have better impact strength, coloring properties and weather resistance when compared to the thermoplastic resins of Comparative Examples 6 to 10.

Particularly, the thermoplastic resins of Examples 3 and 4 according to the present invention were secured to have the same as or better impact strength and coloring properties and remarkably higher weather resistance when compared to the thermoplastic resin using the ABS graft copolymer including the rubber polymer latex without the multi-layer core-shell structure (Comparative Example 6) and the thermoplastic resin using the ABS graft copolymer including the rubber polymer latex with a multi-layer core-shell structure obtained by using butadiene as the constituent component of the bridge shell other than an aromatic vinyl monomer (Comparative Example 7).

In addition, the thermoplastic resins of Examples 3 and 4 according to the present invention were secured to have remarkably better impact strength and coloring properties when compared to the thermoplastic resin using the ABS graft copolymer including the rubber polymer latex which includes the constituent components according to the present invention, however the amount ratio of each constituent component is deviated from the suggested amount in the present invention (Comparative Example 8), and the thermoplastic resins of Examples 3 and 4 according to the present invention were secured to have remarkably better impact strength, coloring properties and weather resistance when compared to the thermoplastic resin using the ABS graft copolymer including the rubber polymer latex which includes the constituent components and the amount ratios according to the present invention, however the addition during polymerization is not continuously performed or the addition point is deviated from the suggested range of the polymerization conversion of the present invention (Comparative Example 9 or 10).

The invention claimed is:

1. Rubber polymer latex with a multi-layer core-shell structure, comprising based on 100 parts by weight of total monomers composing the rubber polymer latex with a multi-layer core-shell structure:
    a diene-based rubber core comprising from 75 to 85 parts by weight of a conjugated diene-based monomer;
    a bridge shell formed on the rubber core and comprising from 5 to 10 parts by weight of a vinyl-based monomer; and
    an outermost shell formed on the bridge shell and comprising from 10 to 15 parts by weight of an acryl-based monomer,
    wherein the vinyl-based monomer is a combination of an aromatic vinyl monomer and a vinyl cyan monomer, and a weight ration of the aromatic vinyl monomer and the vinyl cyan monomer is from 9:1 to 7:3,
    wherein an average particle diameter of the diene-based rubber core is in a range from 2,000 Å to 3,000 Å, and
    wherein a weight ratio of the core, the bridge shell and the outermost shell is 15-17:1-2:2-3.

2. The rubber polymer latex with a multi-layer core-shell structure of claim 1, wherein the average particle diameter of the diene-based rubber core is in a range from 2,400 Å to 2,800 Å.

3. The rubber polymer latex with a multi-layer core-shell structure of claim 1, wherein the conjugated diene-based monomer is at least one selected from the group consisting of 1,3-butadiene, isoprene, 2-chloro-1,3-butadiene and chloroprene.

4. The rubber polymer latex with a multi-layer core-shell structure of claim 1, wherein the acryl-based monomer is at least one selected from the group consisting of (meth)acrylic acid and alkyl(meth)acrylate having a $C_1$-$C_{16}$ alkyl group.

5. The rubber polymer latex with a multi-layer core-shell structure of claim 1, wherein the rubber polymer latex with a multi-layer core-shell has an average particle diameter in a range from 3,000 Å to 3,500 Å, and a gel content from 70% to 90%.

6. The rubber polymer latex with a multi-layer core-shell structure of claim 1, wherein the aromatic vinyl monomer is at least one selected from the group consisting of styrene, α-methylstyrene, α-ethylstyrene and ρ-methylstyrene.

7. The rubber polymer latex with a multi-layer core-shell structure of claim 1, wherein the vinyl cyan monomer is at least one selected from the group consisting of acrylonitrile, methacrylonitrile and ethacrylonitrile.

8. An acrylonitrile-butadiene-styrene (ABS) graft copolymer comprising:
    from 50 wt % to 70 wt % of the rubber polymer latex with a multi-layer core-shell structure of claim 1; and
    from 30 wt % to 50 wt % of at least one vinyl-based monomer selected from an aromatic vinyl monomer and a vinyl cyan monomer.

9. A thermoplastic resin composition comprising:
    from 21 to 30 parts by weight of the ABS graft copolymer of claim 8; and
    from 70 to 79 parts by weight of a copolymer of an aromatic vinyl monomer and a vinyl cyan monomer, having a weight average molecular weight from 120,000 g/mol to 150,000 g/mol, based on 100 parts by weight of the thermoplastic resin composition.

10. A method of preparing rubber polymer latex with a multi-layer core-shell of claim 1, the method comprising, based on 100 parts by weight of monomers composing the rubber polymer latex with a multi-layer core-shell:
    1) adding from 75 to 85 parts by weight of the conjugated diene-based monomer into a polymerization reactor and initiating polymerization to form the diene-based rubber core having an average particle diameter from 2,000 Å to 3,000 Å;
    2) polymerizing the vinyl-based monomer while continuously adding a mixture of 5 to 10 parts by weight of the vinyl-based monomer and 0.01 to 0.1 parts by weight of a cross-linking agent into the polymerization reactor when a polymerization conversion arrives at a range from 40% to 60% to form the bridge shell on the diene-based rubber core; and
    3) polymerizing the acryl-based monomer while continuously adding a mixture including from 10 to 15 parts by weight of the acryl-based monomer and from 0.01 to 0.1 parts by weight of a cross-linking agent into the polymerization reactor when a polymerization conversion arrives at a range from 70% to 90% to form the outermost shell on the bridge shell,
    wherein the vinyl-based monomer is a combination of an aromatic vinyl monomer and vinyl cyan monomer, and a weight ratio of the aromatic vinyl monomer and the vinyl cyan monomer is from 9:1 to 7:3.

11. The method of preparing rubber polymer latex with a multi-layer core-shell of claim 10, wherein the conjugated diene-based monomer is added at from 65° C. to 75° C. into the polymerization reactor in a batch or continuously in step 1).

12. The method of preparing rubber polymer latex with a multi-layer core-shell of claim 10, wherein the bridge shell in step 2) and the outermost shell in step 3) are cross-linked by the cross-linking agent, respectively.

13. The method of preparing rubber polymer latex with a multi-layer core-shell of claim 10, wherein the cross-linking agent is at least one selected from the group consisting of polyethylene glycol dimethacrylate (n=1-60), polyethylene glycol diacrylate (n=1-60), propylene glycol dimethacrylate, 1,3-butylene glycol dimethacrylate, 1,6-hexanediol dimethacrylate, 1,4-butylene glycol dimethacrylate, aryl methacrylate, diethyl glycol dimethacrylate, trimethylolpropane trimethacrylate, polybisphenol A-ethylene oxide diacrylate (n=1-40), tetraethylene glycol dimethacrylate, triethylene glycol dimethacrylate, divinylbenzene and a compound including at least two vinyl functional groups at terminal thereof.

14. The method of preparing rubber polymer latex with a multi-layer core-shell of claim 10, wherein the polymerization in steps 1), 2) and 3) are performed in the presence of an emulsifier.

15. The method of preparing rubber polymer latex with a multi-layer core-shell of claim 14, wherein the emulsifier is at least one selected from the group consisting of an anionic adsorption type emulsifier, a non-ionic emulsifier, a reactive emulsifier and a polymeric reactive emulsifier.

* * * * *